(12) United States Patent
Motwani et al.

(10) Patent No.: US 10,225,271 B2
(45) Date of Patent: Mar. 5, 2019

(54) DISTRIBUTED STORAGE NETWORK WITH ENHANCED SECURITY MONITORING

(71) Applicant: International Business Machines Corporation, Armonk, NY (US)

(72) Inventors: Manish Motwani, Chicago, IL (US); Brian F. Ober, Lake in the Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 15/261,472

(22) Filed: Sep. 9, 2016

(65) Prior Publication Data

US 2018/0077173 A1 Mar. 15, 2018

(51) Int. Cl.
| | |
|---|---|
| *G08B 23/00* | (2006.01) |
| *G06F 12/16* | (2006.01) |
| *G06F 12/14* | (2006.01) |
| *G06F 11/00* | (2006.01) |
| *H04L 29/06* | (2006.01) |

(Continued)

(52) U.S. Cl.
CPC .......... *H04L 63/1416* (2013.01); *G06F 3/062* (2013.01); *G06F 3/067* (2013.01); *G06F 3/0653* (2013.01); *H04L 63/1433* (2013.01); *G06F 3/064* (2013.01); *G06F 3/0619* (2013.01); *H03M 13/1515* (2013.01); *H03M 13/616* (2013.01)

(58) Field of Classification Search
CPC . H04L 63/1416; H04L 63/1433; G06F 3/062; G06F 3/0653; G06F 3/067; G06F 3/0619; G06F 3/064; H03M 13/1515

USPC .......................................................... 726/23
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Bill Allcock; Secure, Efficient Data Transport and Replica Management for High-Performance Data-Intensive Computing; IEEE:2011; p. 1-15.*

(Continued)

*Primary Examiner* — Monjur Rahim
(74) *Attorney, Agent, or Firm* — Garlick & Markison; Timothy W. Markison; Patricia A. Markison

(57) ABSTRACT

A method includes receiving a data access request from a requesting device regarding one or more encoded data slices. A data object is dispersed storage error encoded into a plurality of sets of encoded data slices that are stored in storage units of a dispersed storage network (DSN). The method further includes determining whether one or more of the data access request, the requesting device, and the data object is affiliated with a DSN entity flagged for enhanced security monitoring. When the one or more of the data access request, the requesting device, and the data object is affiliated with the DSN entity flagged for enhanced security monitoring, the method further includes determining enhanced security monitoring parameters; generating security monitoring information in accordance with the enhanced security monitoring parameters; determining a DSN security threat level; and implementing a security protocol based on the DSN security threat level.

18 Claims, 6 Drawing Sheets

(51) Int. Cl.
*G06F 3/06* (2006.01)
*H03M 13/15* (2006.01)
*H03M 13/00* (2006.01)

(56) References Cited

U.S. PATENT DOCUMENTS

| | | | |
|---|---|---|---|
| 5,485,474 A * | 1/1996 | Rabin | G06F 11/004 |
| | | | 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 * | 7/2006 | Kitamura | G06F 11/1092 |
| | | | 714/6.21 |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 * | 4/2009 | Gladwin | H04L 67/1097 |
| | | | 709/203 |
| 2010/0023524 A1 | 1/2010 | Gladwin et al. | |
| 2012/0030740 A1 * | 2/2012 | Baptist | H04L 63/08 |
| | | | 726/6 |
| 2015/0128274 A1 * | 5/2015 | Giokas | H04L 63/1416 |
| | | | 726/23 |
| 2016/0065601 A1 * | 3/2016 | Gong | G06F 21/561 |
| | | | 726/23 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed, or dispersed, storage network (DSN) 10

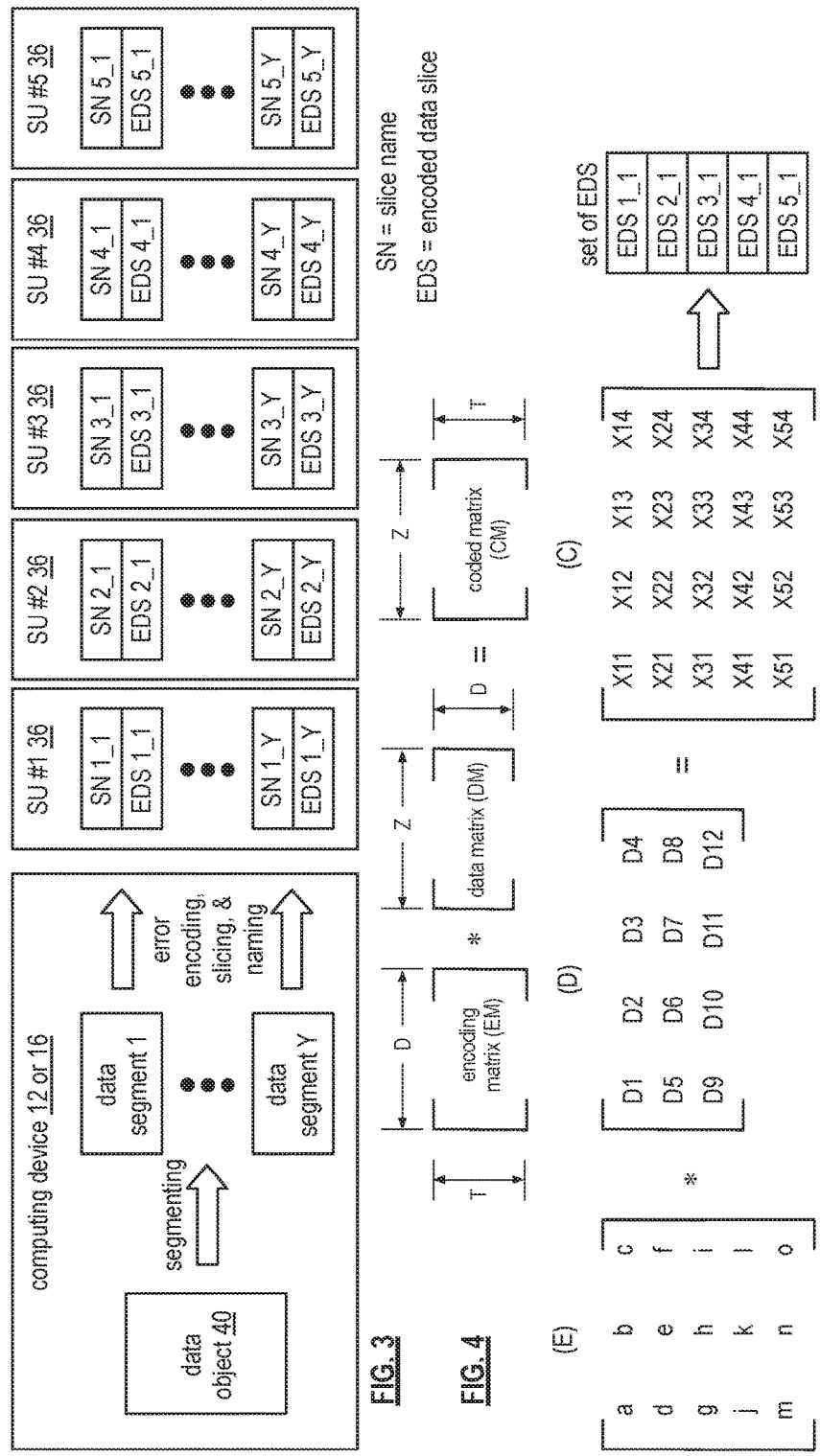

ID
DISTRIBUTED STORAGE NETWORK WITH ENHANCED SECURITY MONITORING

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
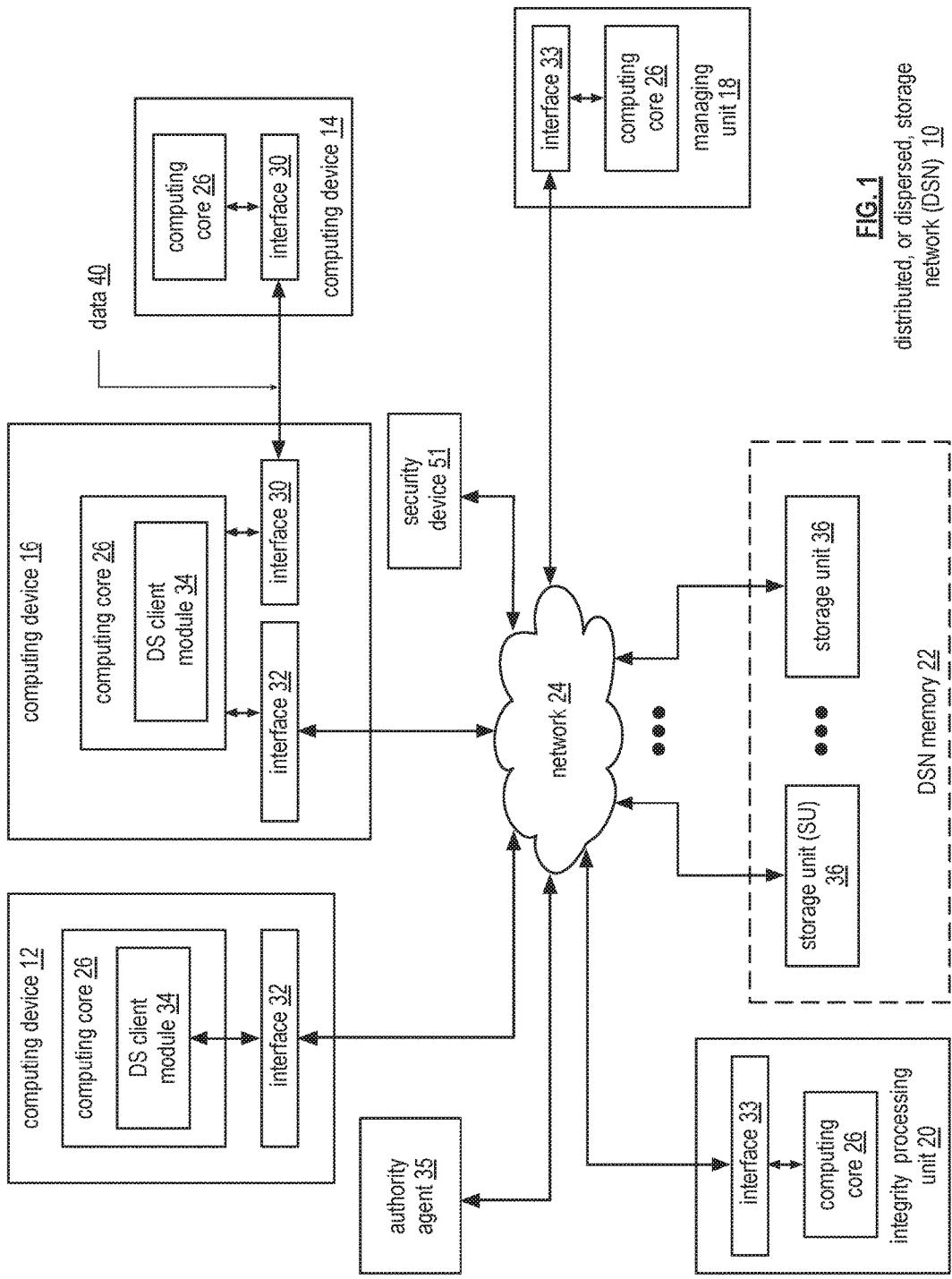
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, a DSN memory 22, an authority agent 35, and a security device 51. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
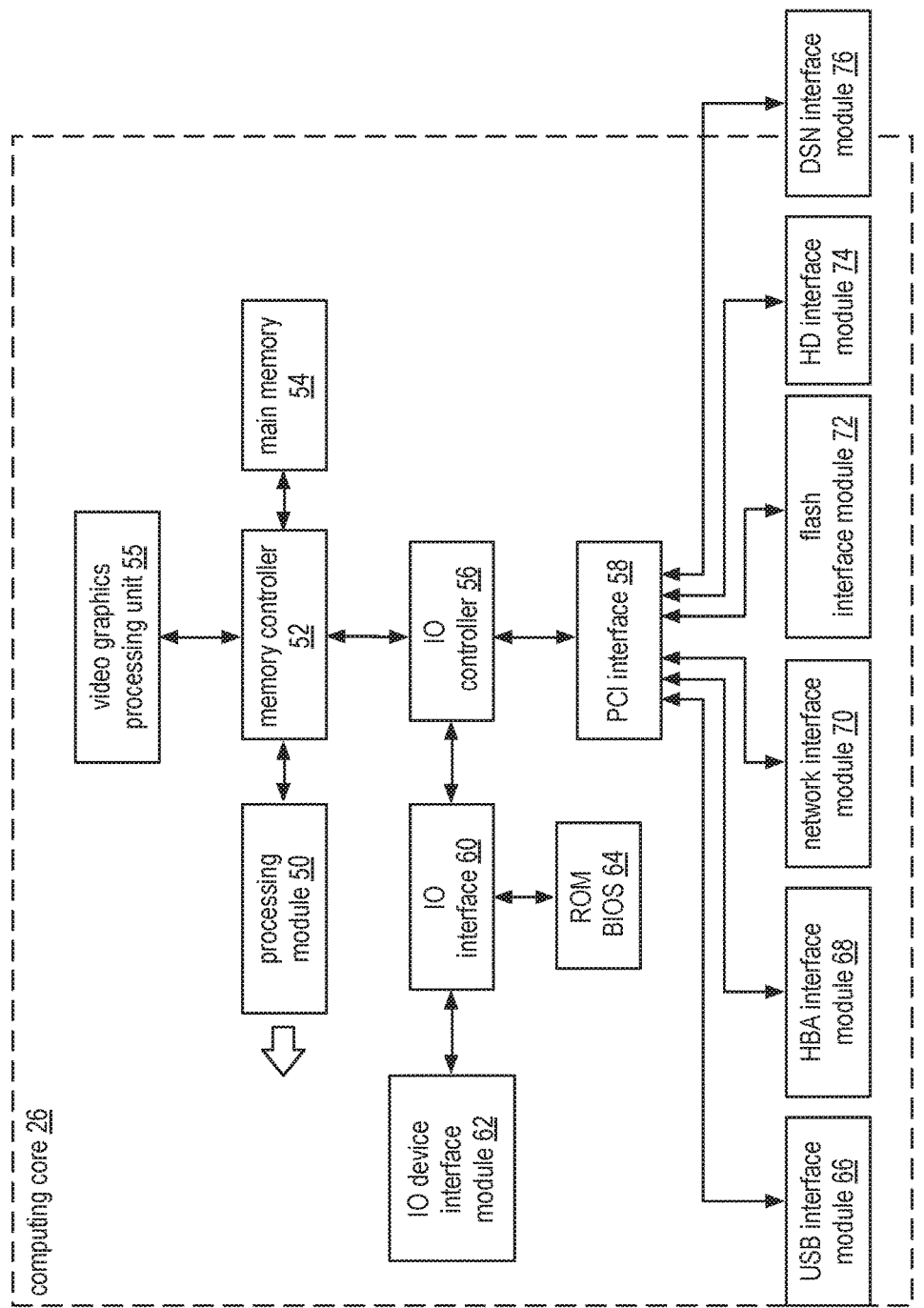
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

The authority agent 35 monitors data access requests (e.g., read requests, write requests, edit requests, delete requests, list requests, etc.) within the DSN 10. The authority agent 35 may maintain a list of flagged DSN entities (e.g., a device; a set of devices; a data file; a data object; a data container; and a vault) that trigger enhanced security monitoring. For example, the authority agent 35 may maintain a list of sensitive data objects that are stored in the DSN 10 as a plurality of sets of encoded data slices. Sensitive data objects are flagged such that a request to access any encoded data slice of the plurality of sets of encoded data slices of the flagged data object will trigger enhanced security monitoring within the DSN. As another example, the authority agent 35 may maintain a list of authorized DSN devices such that unauthorized requesting devices are flagged by the authority agent 35 for enhanced security monitoring. When an access request, requesting device, or data object is determined to be associated with a flagged DSN entity, the authority agent 35 will notify other devices within the DSN of the determination. Further, when the one or more of the data access request, the requesting device, and the data object is affiliated with the DSN entity flagged for enhanced security monitoring, the authority agent 35 may receive data access notifications from other DSN devices as well as a copy of the accessed data to review. Note that the authority agent 35 may be a separate computing device, may be a common computing device, and/or may be integrated into one or more of the computing devices 12-16, the managing unit 18, the integrity processing unit 20, and/or into one or more of the storage units 36. A more detailed discussion of enhanced security monitoring within the DSN is subsequently described with reference to one or more of FIGS. 9-11.

The security device 51 interprets security monitoring information generated regarding the flagged DSN entity that has triggered enhanced security monitoring. The security device 51 interprets the security monitoring information (generated in accordance with enhanced security monitoring parameters determined by a computing device when the one or more of the data access request, the requesting device, and the data object is affiliated with the DSN entity flagged for enhanced security monitoring) in order to determine a DSN security threat level. The security device 51 is also able to implement a security protocol based on the DSN security threat level. Note that the security device 51 may be a separate computing device, may be a common computing device, and/or may be integrated into one or more of the computing devices 12-16, the managing unit 18, the integrity processing unit 20, the authority agent 35, and/or into one or more of the storage units 36. The enhanced security monitoring, enhanced security monitoring parameters, security monitoring information, DSN security threat level, and the security protocol are subsequently described in more detail with reference to one or more of FIGS. 9-11.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
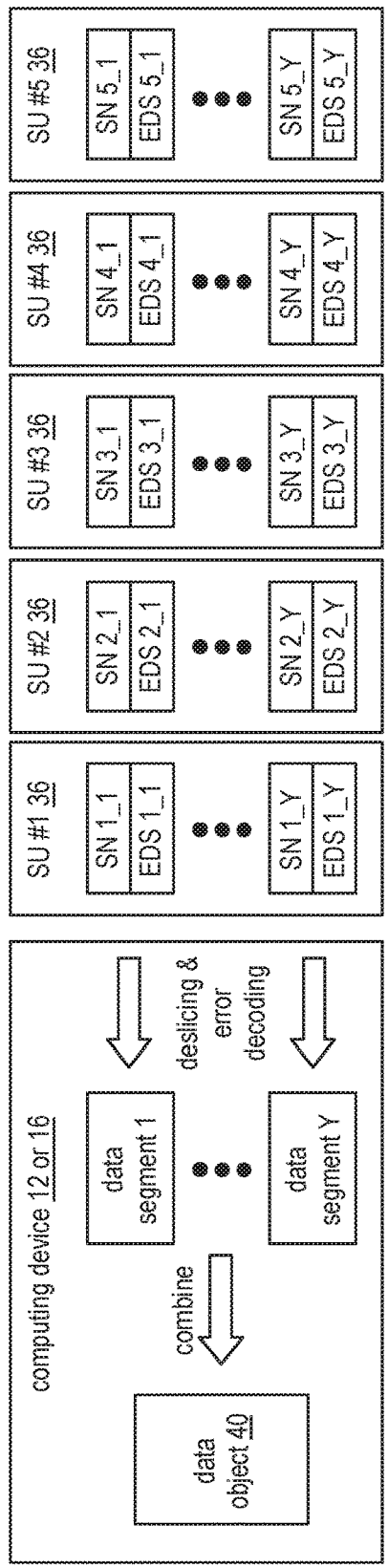
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
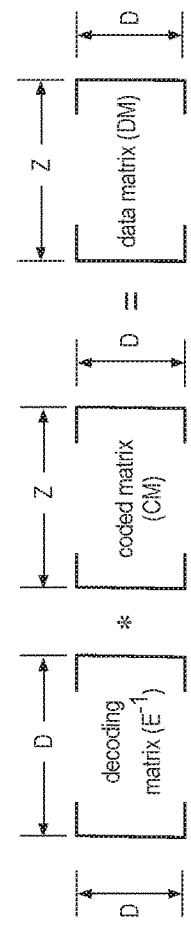
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
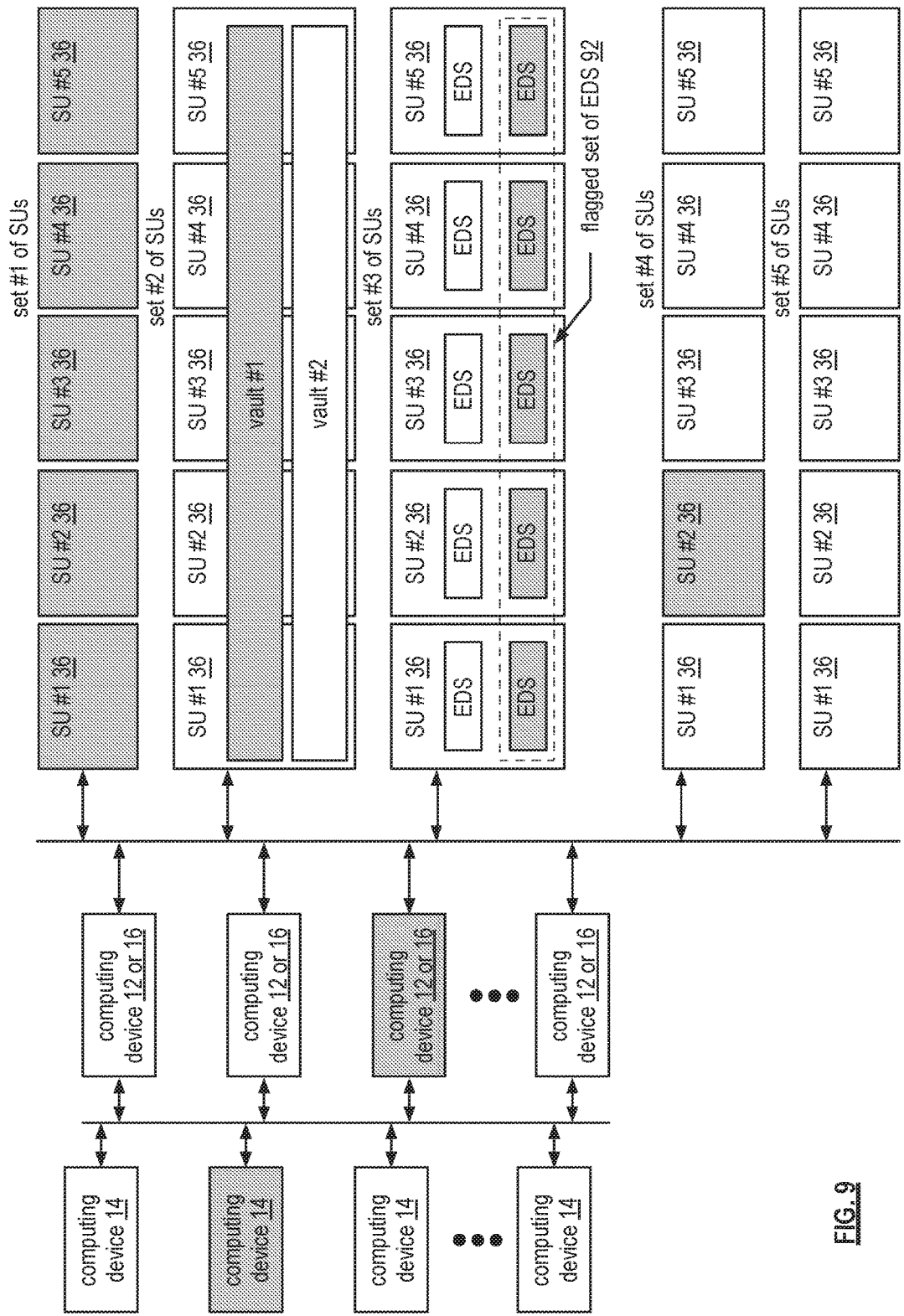
FIG. 9 is a schematic block diagram of an embodiment of data access requests that do not trigger enhanced security monitoring within the DSN in accordance with the present invention.

FIG. 9 is a schematic block diagram of an example of DSN including enhanced security monitoring. In this example, only a plurality of user computing devices 14, a plurality of service provider computing devices 12 and/or 16, and a plurality of storage units 36 of the DSN are shown. For illustrative purposes, the storage units are arranged into five sets of storage units with each set including five storage units. Each set of storage units stores sets of encoded data slices as previously discussed.

Within the DSN, some entities (e.g., gray colored boxes) are flagged for enhanced security monitoring and other entities (e.g., white colored boxes) are not. For example, one or of the user computing devices 14 is flagged for enhanced security monitoring. As another example, one the of the service provider computing devices 12 or 16 is flagged for enhanced security monitoring. As yet another example, the first set of storage units is flagged for enhanced security monitoring. As a further example, a vault (e.g., vault 1 supported by the second set of storage units) is flagged for enhanced security monitoring. As another further example, one or more sets of encoded data slices (EDS) stored in a third set of storage units (e.g., a data segment, a portion of a data object, a data object, a plurality of data objects) are flagged for enhanced security monitoring. As a still further example, storage unit #2 of a fourth set of storage units is flagged for enhanced security monitoring.

A computing device, or devices, determines which DSN entities are flagged for enhanced security monitoring and which are not based on one or more potential security risks. The computing device(s) is a designated one of the computing devices 12-16, is the managing unit 18, is the integrity processing unit 20, and/or is another computing device(s) added to the DSN for security monitoring ("the security computing device"). The security computing device may include the authority agent 35 and/or the security device 51. A potential security risk includes, but is not limited to, a potential unauthorized computing device 12-16, a potential unauthorized data access, a potential unauthorized storage unit 36, and a potential compromised storage unit 36.

As an example, the security computing device flags one of computing devices 14 for enhanced security monitoring by one or more of: exceeding a level of unauthorized data access requests (e.g., too many unauthorized requests to data it is not allowed to access or to data that is not in the DSN in a given period of time, which exceeds the level of reasonable human error); receiving a message regarding the computing device; and at random as part of a security policy.

As another example, the security computing device flags one of computing devices 12 or 16 for enhanced security monitoring by one or more of: exceeding a level of unauthorized data access requests; the mannerism of data access requests (e.g., uses an atypical mannerism such as sending data access request to one or a few storage units, where the typical mannerism is sending at least a decode threshold number of requests); receiving a message regarding the computing device; and at random as part of a security policy.

As yet another example, the security computing device flags stored data for enhanced security monitoring based on one or more of: an originator of the data; a requestor of the data; atypical mannerisms of access requests; receiving a message regarding the computing device; and at random as part of a security policy. The flagging of data may be at the slice level, at data segment level, at a data object level, for multiple data objects, for a vault, for a storage container, for a set of storage units, or for one or more storage units in a set.

In an example of operation, the security computing device receives (e.g., is sent, monitors, and/or detects) a data access request, which may be a read request, write request, edit request, delete request, list request, etc. The data access request is regarding a data object, or portion thereof, that is stored in storage units as a plurality of sets of encoded data slices. The security computing device determines whether the data access request, the requesting device, and/or the data object is affiliated with a DSN entity flagged for enhanced security monitoring. If it is, the security computing device raises a potential security threat, monitors it, and, when appropriate, implements a security protocol.

As an example, the security computing device determines that a data access request involves a flagged DSN entity when the data object requested is stored in or is to be stored in a vault flagged for enhanced security monitoring. As another example, the security computing device determines that the requesting device itself is flagged for enhanced security monitoring. As another example, the security computing device determines that the data access request is requesting an unauthorized edit of encoded data slice(s) (e.g., the requesting device is attempting to corrupt the error encoded data slices). As another example, the security computing device determines that one or more of the DSN storage units in the set storing the encoded data object is flagged for enhanced security monitoring. As another example, the security computing device determines that content of the data object includes one or more content trigger words or phrases (e.g., the data object includes prohibited data). As another example, the security computing device determines that a data object name or a file name associated with the data object includes one or more naming trigger words or phrases. As another example, the security computing device determines that a signature associated with the data object includes one or more signature trigger words or phrases.

The security computing device may also identify an atypical mannerism of the data access request and thus determine that the requesting device is a DSN entity flagged for enhanced security monitoring. For instance, the computing device may identify a request to access only one or two storage units as an atypical mannerism of a data access request. Such a request would identify the requesting device as a DSN entity flagged for enhanced security monitoring because an authorized device would access the appropriate amount of storage units necessary to access the data object. As another example, the security computing device identifies a request to access less than a decode threshold number of encoded data slices as an atypical mannerism of a data access request. As another example, the security computing device identifies a set of requests that do not correspond to a read threshold or a write threshold of encoded data slices as an atypical mannerism of a data access request.

As another example, the security computing device determines that a data access request involves a flagged DSN entity by receiving an indicator from the authority agent that the data access request involves a flagged DSN entity. The authority agent determines that the data access request involves a flagged DSN entity. Upon this determination, the authority agent sends out an indicator alerting the appropriate DSN device(s) of a data access request's association with a flagged DSN entity. The appropriate DSN device may be the computing device as mentioned above or it may be another device within the DSN. For example, if the computing device receiving the data access request is itself flagged for enhanced security monitoring (i.e., it is the flagged computing device), the authority agent may alert the device that the flagged computing device wishes to access (e.g., a set of storage units, a vault, etc.) of the computing device's status.

When the data access request is affiliated with a flagged DSN entity, the security computing device determines enhanced security monitoring parameters. The enhanced security monitoring parameters may include one or more of current monitoring, historical monitoring (e.g., retrieving historical security monitoring information), a monitoring level (e.g., how much and what kind of security monitoring information to collect), and data access restrictions (e.g., denying or limiting the data access requested). If the enhanced security monitoring parameters includes historical data, the computing device will retrieve historical security monitoring information regarding the one or more of the data access request, the requesting device, and the data object affiliated with the DSN entity flagged for enhanced security monitoring. The computing device will then combine the historical security monitoring information with current security monitoring information associated with the data access request.

Based on the enhanced security monitoring parameters, the security computing device will then generate security monitoring information regarding the one or more of the data access request, the requesting device, and the data object affiliated with the DSN entity flagged for enhanced security monitoring. The security monitoring information includes one or more of: auditing and logging information, copying all accessed data for review by the authority agent, notifying the authority agent of specific data accesses, and generating a copy of data that the flagged requesting device requests for deletion. When the security monitoring information includes auditing and logging information, an enhanced audit log may be generated. An enhanced audit log is generated to keep track of and store information regarding the data access request affiliated with the flagged DSN entity. The enhanced audit log may track and store information such as a device ID of the requesting device, a user ID of the requesting device, the time of the data access request, the duration of the data access request, whether there were data access errors (e.g., failed data accesses, denied data accesses, etc.), information regarding the data being accessed, location information of requesting device, and routing of data information.

The security computing device interprets the security monitoring information to determine a DSN security threat level. For example, the authority agent notifies the security computing device that, after reviewing the data access request, it is not a security threat to the DSN. However, the security computing device may continue monitoring the one or more of the data access request, the requesting device, and the data object affiliated with the flagged DSN entity in case the threat level changes. As another example, the security computing device recognizes that the data requested is highly sensitive and that the requesting device is an unauthorized DSN entity. In that situation, the DSN threat level will be considered high, and the DSN will respond with the appropriate security protocol.

Based on the DSN security threat level, the security computing device implements a security protocol. The security protocol includes denying the requesting device further access to the DSN, verifying the integrity of the one or more encoded data slices, verifying the integrity of the plurality of sets of encoded data slices, denying access to the one or more encoded data slices, denying access to the plurality of sets of encoded data slices, and/or restricting access to one or more of the storage units.

Figure 10:
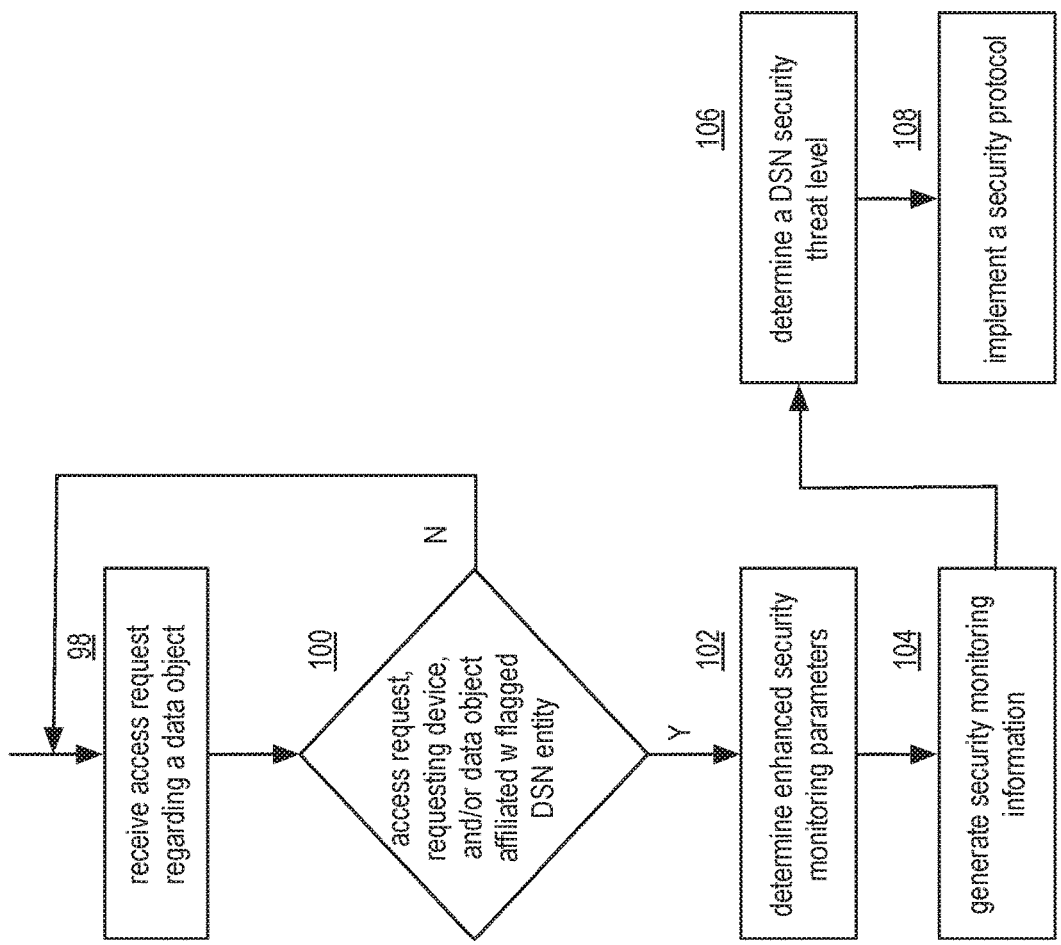
FIG. 10 is a logic diagram of an example of a method of enhanced security monitoring within the DSN in accordance with the present invention.

FIG. 10 is a flowchart illustrating an example of enhanced security monitoring within the DSN. The method begins at step 98 where a computing device in the DSN receives a data access request (e.g., a read request, a write request, an edit request, a delete request, a listing request, etc.) from a requesting device regarding one or more encoded data slices. A data object is dispersed storage error encoded into a plurality of sets of encoded data slices that includes the one or more encoded data slices, and the plurality of sets of encoded data slices are stored in storage units of the DSN.

The method continues with step 100 where the computing device and/or the authority agent determines whether the data access request, the requesting device, and/or the data object is affiliated with a DSN entity flagged for enhanced security monitoring. A DSN entity may be a device, a set of devices, a data file, a data object, a data container, and/or a vault within the DSN. Such a determination may be made by the computing device determining that the data object requested is stored in or is to be stored in a vault flagged for enhanced security monitoring; that the requesting device is flagged for enhanced security monitoring; that the requesting device is not authorized to issue the data access request; that the data access request is requesting an unauthorized edit of the one or more encoded data slices (e.g., the requesting device is attempting to corrupt the error encoded data slices); and/or that one or more of the DSN storage units requested for access is flagged for enhanced security monitoring. Such a determination may also be made by the computing device determining that content of the data object requested for access includes one or more content trigger words or phrases (e.g., the data object includes prohibited data); that a data object name or a file name associated with the data object requested for access includes one or more naming trigger words or phrases; and/or that a signature associated with the data object requested for access includes one or more signature trigger words or phrases.

The computing device may also determine that the data access request, the requesting device, and/or the data object is affiliated with a DSN entity flagged for enhanced security monitoring by identifying an atypical mannerism of the data access request. For instance, the computing device may identify a request to access only one or two storage units as an atypical mannerism of a data access request. Such a request would identify the requesting device as a DSN entity flagged for enhanced security monitoring because an authorized device would access the appropriate amount of storage units necessary to access the data object. As another example, the computing device may identify a request to access less than a decode threshold number of encoded data slices as an atypical mannerism of a data access request. As another example, the computing device may identify a set of requests that do not correspond to a read threshold or a write threshold of encoded data slices as an atypical mannerism of a data access request. In both of the above examples, the request would identify the requesting device as a DSN entity flagged for enhanced security monitoring because an authorized device would access the appropriate amount of encoded data slices necessary to access the data object.

As another example, the computing device may determine that one or more of the data access request, the requesting device, and the data object is affiliated with the DSN entity flagged for enhanced security monitoring by receiving an indicator from the authority agent that the data access request involves a flagged DSN entity. If the data access request, the requesting device, and/or the data object are not affiliated with a DSN entity flagged for enhanced security monitoring, the method branches back to step 98. If the data access request, the requesting device, and/or the data object are affiliated with a DSN entity flagged for enhanced security monitoring, the method continues to step 102.

When the method continues to step 102, the computing device determines enhanced security monitoring parameters. The enhanced security monitoring parameters may include one or more of current monitoring, historical monitoring (e.g., retrieving historical security monitoring information), a monitoring level (e.g., how much and what kind of security monitoring information to collect), and data access restrictions (e.g., denying or limiting the data access requested). If the enhanced security monitoring parameters includes historical data, the computing device will retrieve historical security monitoring information regarding the one or more of the data access request, the requesting device, and the data object affiliated with the DSN entity flagged for enhanced security monitoring. The computing device will then combine the historical security monitoring information with current security monitoring information associated with the data access request to produce the security monitoring information.

The method continues with step 104 where the computing device generates security monitoring information regarding the one or more of the data access request, the requesting device, and the data object affiliated with the DSN entity flagged for enhanced security monitoring in accordance with the enhanced security monitoring parameters. The security monitoring information may include auditing and logging information, copying and sending all accessed data to the authority agent for review, notifying the authority agent of specific data accesses, and generating a copy of data that the flagged requesting device requests for deletion. When the security monitoring information includes auditing and logging information, an enhanced audit log may be generated. An enhanced audit log is generated to keep track of and store information regarding the data access request affiliated with the flagged DSN entity. The enhanced audit log may track and store information such as a device ID of the requesting device, a user ID of the requesting device, the time of the data access request, the duration of the data access request, whether there were data access errors (e.g., failed data accesses, denied data accesses, etc.), information regarding the data being accessed, location information of requesting device, and routing of data information.

The method continues with step 106 where the computing device and/or the security device interprets the security monitoring information to determine a DSN security threat level. For example, the authority agent may notify the computing device and/or the security device that after reviewing the copy of the data that was requested for access, it was determined that the data access request poses no real threat to the DSN. However, the computing device and/or the authority agent may continue monitoring the one or more of the data access request, the requesting device, and the data object affiliated with the flagged DSN entity in case the threat level changes. As another example, the computing device and/or the security device may recognize that the data requested is highly sensitive and that the requesting device is an unauthorized DSN entity. In that situation, the DSN threat level will be considered high, and the DSN will respond with the appropriate security protocol.

The method continues with step 106 where the computing device and/or the security device implement a security protocol based on the DSN security threat level. The security protocol may include denying the requesting device further access to the DSN, verifying the integrity of the one or more encoded data slices, verifying the integrity of the plurality of sets of encoded data slices, denying access to the one or more encoded data slices, denying access to the plurality of sets of encoded data slices, and/or restricting access to one or more of the storage units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a computing device in a dispersed storage network (DSN), a data access request from a requesting device regarding one or more encoded data slices, wherein a data object is dispersed storage error encoded into a plurality of sets of encoded data slices that includes the one or more encoded data slices, and wherein the plurality of sets of encoded data slices are stored in storage units of the DSN;
    determining, by the computing device, whether one or more of the data access request, the requesting device, and the data object is affiliated with a DSN entity flagged for enhanced security monitoring;
    when the one or more of the data access request, the requesting device, and the data object is affiliated with the DSN entity flagged for enhanced security monitoring:
        determining, by the computing device, enhanced security monitoring parameters;
        generating, by the computing device, security monitoring information regarding the one or more of the data access request, the requesting device, and the data object in accordance with the enhanced security monitoring parameters;
        interpreting, by at least one of the computing device and a security device of the DSN, the security monitoring information to determine a DSN security threat level; and
        implementing, by the at least one of the computing device and the security device, a security protocol based on the DSN security threat level.

2. The method of claim 1, wherein the DSN entity comprises one of:
    a device;
    a set of devices;
    a data file;
    a data object;
    a data container; and
    a vault.

3. The method of claim 1, wherein the determining whether the one or more of the data access request, the requesting device, and the data object is affiliated with the DSN entity flagged for enhanced security monitoring comprises one or more of:
    determining that the data object is stored in or is to be stored in a vault flagged for enhanced security monitoring;
    determining that the requesting device is flagged for enhanced security monitoring;
    determining that the requesting device is not authorized to issue the data access request regarding the one or more encoded data slices;
    determining that the data access request is requesting an unauthorized edit of the one or more encoded data slices;
    determining that the one or more of the storage units is flagged for enhanced security monitoring;
    determining that content of the data object includes one or more content trigger words or phrases;
    determining that a data object name or a file name associated with the data object includes one or more naming trigger words or phrases; and
    determining that a signature associated with the data object includes one or more signature trigger words or phrases.

4. The method of claim 1, wherein the enhanced security monitoring parameters comprises one or more of:
    current monitoring;
    historical monitoring;
    a monitoring level; and
    data access restrictions.

5. The method of claim 1, wherein the security monitoring information comprises one or more of:
    auditing and logging information;
    copying all accessed data for review by an authority agent;
    notifying the authority agent of specific data accesses; and
    generating a copy of data that a requesting device flagged for enhanced security monitoring requests for deletion.

6. The method of claim 1 further comprises:
    when the enhanced security monitoring parameters includes historical data:
        retrieving historical security monitoring information regarding the one or more of the data access request, the requesting device, and the data object affiliated with the DSN entity flagged for enhanced security monitoring; and
        combining the historical security monitoring information with current security monitoring information associated with the data access request to produce the security monitoring information.

7. The method of claim 1, wherein the determining whether the one or more of the data access request, the requesting device, and the data object is affiliated with the DSN entity flagged for enhanced security monitoring comprises:
    identifying an atypical mannerism of the data access request; and
    determining that, as a result of the atypical mannerism, the requesting device is the DSN entity flagged for enhanced security monitoring.

8. The method of claim 1, wherein the determining whether the one or more of the data access request, the requesting device, and the data object is affiliated with the DSN entity flagged for enhanced security monitoring comprises:
    receiving, from an authority agent, an indicator that the one or more of the data access request, the requesting device, and the data object is affiliated with the DSN entity flagged for enhanced security monitoring.

9. The method of claim 1, wherein the implementing a security protocol comprises one or more of:
    denying further access to the DSN by the requesting device;
    verifying integrity of the one or more encoded data slices;
    verifying integrity of the plurality of sets of encoded data slices;
    denying access to the one or more encoded data slices;
    denying access to the plurality of sets of encoded data slices; and
    restricting access to one or more of the storage units.

10. A computer readable memory comprises:
    a first memory element that stores operational instructions that, when executed by a computing device of a dispersed storage network (DSN), causes the computing device to:

receive a data access request from a requesting device regarding one or more encoded data slices, wherein a data object is dispersed storage error encoded into a plurality of sets of encoded data slices that includes the one or more encoded data slices, and wherein the plurality of sets of encoded data slices are stored in storage units of the DSN;

a second memory element that stores operational instructions that, when executed by the computing device, causes the computing device to:

determine whether one or more of the data access request, the requesting device, and the data object is affiliated with a DSN entity flagged for enhanced security monitoring;

when the one or more of the data access request, the requesting device, and the data object is affiliated with the DSN entity flagged for enhanced security monitoring:

a third memory element that stores operational instructions that, when executed by the computing device, causes the computing device to:

determine enhanced security monitoring parameters;

generate security monitoring information regarding the one or more of the data access request, the requesting device, and the data object in accordance with the enhanced security monitoring parameters; and a fourth memory element that stores operational instructions that, when executed by at least one of the computing device and a security device of the DSN, causes the at least one of the computing device and the security device to:

interpret the security monitoring information to determine a DSN security threat level; and implement a security protocol based on the DSN security threat level.

11. The computer readable memory of claim 10, wherein the DSN entity comprises one of:
a device;
a set of devices;
a data file;
a data object;
a data container; and
a vault.

12. The computer readable memory of claim 10, wherein the second memory element further stores operational instructions that, when executed by the computing device, causes the computing device to determine whether the one or more of the data access request, the requesting device, and the data object is affiliated with the DSN entity flagged for enhanced security monitoring by one or more of:

determining that the data object is stored in or is to be stored in a vault flagged for enhanced security monitoring;

determining that the requesting device is flagged for enhanced security monitoring;

determining that the requesting device is not authorized to issue the data access request regarding the one or more encoded data slices;

determining that the data access request is requesting an unauthorized edit of the one or more encoded data slices;

determining that the one or more of the storage units is flagged for enhanced security monitoring;

determining that content of the data object includes one or more content trigger words or phrases;

determining that a data object name or a file name associated with the data object includes one or more naming trigger words or phrases; and determining that a signature associated with the data object includes one or more signature trigger words or phrases.

13. The computer readable memory of claim 10, wherein the enhanced security monitoring parameters comprises one or more of:
current monitoring;
historical monitoring;
a monitoring level; and
data access restrictions.

14. The computer readable memory of claim 10, wherein the security monitoring information comprises one or more of:

auditing and logging information;

copying all accessed data for review by an authority agent;

notifying the authority agent of specific data accesses; and generating a copy of data that a requesting device flagged for enhanced security monitoring requests for deletion.

15. The computer readable memory of claim 10, wherein the third memory element further stores operational instructions that, when executed by the computing device, causes the computing device to:

when the enhanced security monitoring parameters includes historical data:

retrieve historical security monitoring information regarding the one or more of the data access request, the requesting device, and the data object affiliated with the DSN entity flagged for enhanced security monitoring; and combine the historical security monitoring information with current security monitoring information associated with the data access request to produce the security monitoring information.

16. The computer readable memory of claim 10, wherein the second memory element further stores operational instructions that, when executed by the computing device, causes the computing device to determine whether the one or more of the data access request, the requesting device, and the data object is affiliated with the DSN entity flagged for enhanced security monitoring by:

identifying an atypical mannerism of the data access request; and determining that, as a result of the atypical mannerism, the requesting device is the DSN entity flagged for enhanced security monitoring.

17. The computer readable memory of claim 10, wherein the second memory element further stores operational instructions that, when executed by the computing device, causes the computing device to determine whether the one or more of the data access request, the requesting device, and the data object is affiliated with the DSN entity flagged for enhanced security monitoring by:

receiving, from an authority agent, an indicator that the one or more of the data access request, the requesting device, and the data object is affiliated with the DSN entity flagged for enhanced security monitoring.

18. The computer readable memory of claim 10, wherein the fourth memory element that stores operational instructions that, when executed by the at least one of the computing device and a security device, causes the at least one of the computing device and the security device to implement the security protocol by one or more of:

denying further access to the DSN by the requesting device;
verifying integrity of the one or more encoded data slices;
verifying integrity of the plurality of sets of encoded data slices;
denying access to the one or more encoded data slices;
denying access to the plurality of sets of encoded data slices; and
restricting access to one or more of the storage units.

* * * * *